Patented Feb. 29, 1944

2,343,230

UNITED STATES PATENT OFFICE 2,343,230

PREPARATION OF AMINOTRIAZINE-ALDEHYDE CONDENSATION PRODUCTS

Robert C. Swain, Riverside, and Pierrepont Adams, Stamford, Conn., assignors to American Cyanamid Company, New York, N. Y., a corporation of Maine No Drawing. Application February 27, 1941, Serial No. 380,894

3 Claims. (Cl. 260—72)

This invention relates to a new and improved method of preparing alkylated aminotriazine-aldehyde condensation products useful in the preparation of paints, varnishes, lacquers, printing inks, adhesives, and like compositions.

Alkylated aminotriazine-aldehyde condensation products are commonly prepared by dissolving a suitable aminotriazine, such as melamine, in an aqueous solution of formaldehyde, and heating the solution with a primary alcohol, with removal of water by azeotropic distillation. The dehydration is a time-consuming step which adds considerably to the cost of the process. Although paraformaldehyde may be used in the process in place of aqueous formaldehyde to avoid the necessity of removing water added through the formaldehyde solution, its high cost limits its use to special cases. Until recently, aqueous formaldehyde solutions containing more than about 37% formaldehyde by weight were not commercially obtainable, and even those containing this concentration of formaldehyde required the presence of a stabilizer to prevent formation of paraformaldehyde. Methanol in amounts of 8 to 12% is commercially used as a stabilizer. The addition of methanol to aqueous formaldehyde solutions adds to the cost of the formaldehyde and its presence in the melamine-formaldehyde reaction mixture is objectionable for several reasons. Melamine appears to dissolve more slowly in formaldehyde solutions in the presence of methanol. Another of the disadvantages occasioned by the use of methanol-stabilized formaldehyde in the process of preparing alkylated aminotriazine-aldehyde condensation products is the formation of a ternary distillate in the dehydration step of the process. Water is removed from the condensation product by azeotropically distilling off from the reaction mixture water and a solvent, which may also be the alkylating agent, such as butanol. When methanol is present, however, the distillate is a ternary mixture of methanol, water and solvent from which it is difficult to recover the solvent for reuse in the process.

Aqueous formaldehyde of 30% strength may be obtained in which no stabilizer is required, but the use of solutions of this strength requires the removal of large quantities of water in the azeotropic distillation, and a prolonged heating period is necessitated which tends to increase the viscosity of the resin solution to an undesirable degree. The speed of reaction is also lowered due to the low concentration of formaldehyde, and the capacity of the plant is reduced on account of the increased time of reaction and increased volumes of water to be accommodated in the reaction vessels.

In our copending application, Serial No. 306,516, filed November 28, 1939, now Patent No. 2,237,092, we described a method of stabilizing strong aqueous formaldehyde solutions by the addition thereto of melamine or methylol melamines in amounts of about 1 to 10%. As pointed out in that application, it is possible to obtain stable solutions of high formaldehyde content by the simple expedient of dissolving therein melamine or methylol melamines. The melamine may be dissolved in the aqueous formaldehyde solutions, preferably by adding the melamine and heating to 60–80° C. for a short time. One percent of melamine dissolved in a formaldehyde solution will have a definite stabilizing effect, while 6% of melamine can stabilize a 50% solution of formaldehyde for a period of many months, even when stored at low temperatures. Although it is possible to dissolve more than 10% of melamine in aqueous formaldehyde, it is, in general, not desirable to do so because of the possible formation of a gel, as described in our copending application.

We have now discovered that many of the disadvantages of previously known methods of preparing alkylated aminotriazine-formaldehyde condensation products may be overcome and a superior product obtained in a cheaper and better way when formaldehyde solutions stabilized with melamine or methylol melamines are employed. This is particularly true of the strong aqueous solutions of 40–50% formaldehyde content by weight that are described in our above mentioned application.

For some reason not clearly understood at present, the clear alkylated melamine-formaldehyde lacquers prepared according to our process are more stable upon storage than similar lacquers prepared in the same way but with formaldehyde solutions containing methanol. We also find that melamine-stabilized formaldehyde will dissolve the melamine or other aminotriazine more rapidly than will methanol-stabilized formaldehyde, due, perhaps, to an interfering action of the methanol. Of great practical importance is the improvement in the character of the azeotropic distillate obtained in the dehydration step when using our melamine-stabilized formaldehyde in place of methanol-containing formaldehyde. We find that when alcohols partially immiscible with water are used in the alkylating step, such as butanol, the azeotropic distillate separates sharply and at once into two layers, which greatly simplifies the recovery of the organic solvent fraction. When using butanol as the organic solvent in the azeotropic distillation we find that the distillate immediately separates into two layers; one composed of water containing approximately 8% butanol, and the other containing approximately 80% butanol and 20% water. We are thus enabled, during the first stages of the dehydration, to return the butanol fraction directly to the reaction vessel without an intermediate fractionation step. When methanol is present, as from methanol-stabilized formaldehyde, it acts as a mutual solvent for the water and butanol and the azeotropic distillate is more complex which makes it difficult to reuse the butanol in the dehydration step without first removing the water and methanol. Processing the butanol to recover it is greatly simplified by the use of our methanol-free melamine-stabilized formaldehyde.

When using methanol-free melamine-stabilized formaldehyde solutions of 35 to 40% strength, we find the principal advantage to lie in the simplification of the azeotropic distillate, which, as pointed out above, consists simply of two phases which separate easily, thus greatly simplifying the recovery of the solvent. Also, the melamine employed in the reaction dissolves more readily and the resin solution produced is of materially greater stability.

We prefer to use formaldehyde solutions of fairly high strength, such as 40 to 50% formaldehyde, as we find that the use of concentrated methanol-free formaldehyde reduces considerably the time required for the melamine-formaldehyde reaction to take place. We also find that we are enabled to obtain a larger production capacity from our reaction vessels due to the shortened time period and greater concentration of active materials which they are able to contain. Further, since considerably less water is present, as compared to the use of formaldehyde hitherto available, the dehydration step is materially shortened as to time and simplified in procedure.

It is evident from the foregoing that melamine-stabilized formaldehyde solutions, particularly those of 40 to 50% formaldehyde content, may be employed to great advantage in the manufacture of alkylated melamine-formaldehyde condensation products. In the condensation reaction we may use any aminotriazine such as melamine, formoguanamine, ammeline, monoamino-1,3,5-triazine, monomethyl diamino-1,3,5-triazine, phenyl diamino-1,3,5-triazine, and the like, either singly or in admixture. Ordinarily, we use about 5 moles of formaldehyde for each mole of triazine, but the formaldehyde may be used in amounts ranging from about 2½ moles to 6 or more moles for each mole of aminotriazine. The alkylating agent may be any primary alcohol such as amyl, butyl, octyl, etc.

The following specific examples illustrate in greater detail some of the many modifications to which our invention is susceptible, and it is to be understood that they are given merely to aid in more fully understanding the manner of carrying out our present invention and not in limitation thereof. Parts given are by weight

*Example 1*

330 parts by weight of an aqueous solution of formaldehyde containing 47.7% formaldehyde and stabilized with 6.3% of melamine, was adjusted to a pH of 7.0 by the addition of dilute NaOH. 111.5 parts by weight of melamine was then added with agitation to the formaldehyde and the mixture heated in 35 minutes to 76° C. To the resulting clear solution was added slowly 440 parts by weight of normal butyl alcohol containing 0.30 part by weight of 87% formic acid. During the addition of the acidified alcohol, which required 30 minutes, the temperature of the contents of the reaction vessel was maintained between 70 and 80° C. The water in the mixture was then removed by azeotropic distillation of water-butyl alcohol with frequent additions of dry butyl alcohol to replace the alcohol distilled off. When the vapor temperature reached 100° C., 275 parts of dry butyl alcohol had been added and 317.5 parts by weight of distillate removed. A vacuum of 29 inches of Hg was then applied to the system and the distillation continued at a lower temperature until 380 parts by weight of distillate were removed under vacuum.

To the resin remaining in the reaction vessel was added 16.4 parts by weight of anhydrous butyl alcohol and 158.1 parts by weight of xylene. The resin solution was then filtered to yield a product containing 50% solid resin, 25% butyl alcohol and 25% xylene, with a viscosity at 25° C. on the Gardner-Holdt scale of V-W and a mineral spirit tolerance of 2.1–1.

*Example 2*

405 parts by weight of a 37% methanol-free aqueous solution of formaldehyde stabilized with 2% by weight of melamine, 375 parts by weight of butanol, 118 parts by weight of melamine and 1 part of tributylamine were added to a vessel fitted with an agitator, thermometer, and reflux condenser. The contents of the vessel were heated, and in 18 minutes at a temperature of 85° C. the melamine was completely dissolved. The reaction mixture was heated to 95° C. under refluxing conditions, for 15 minutes, whereupon 0.9 part by weight of 85% $H_3PO_4$ dissolved in 100 parts by weight of butanol was added. The mixture was then allowed to distill. The distillate consisting of an azeotropic mixture of butanol and water separated cleanly into two layers. As the distillation continued a total of 500 parts of butanol were added from time to time in small portions. After one hour and 51 minutes of distillation the temperature of the vapor was 96° C. and 551 parts by weight of the azeotropic mixture had been collected. A vacuum was then applied to the system and the distillation continued for 22 minutes at 87° C. Heating was discontinued and the resin poured from the reaction vessel and filtered.

The same procedure as described above was employed in another run, except that 405 parts of a 37% aqueous solution of formaldehyde stabilized with 10% methanol was used instead of 405 parts of melamine stabilized formaldehyde. It was observed that the melamine dissolved much more slowly in the presence of methanol, less butanol was distilled off in an equivalent period of distillation, and the distillate did not separate as readily into butanol and aqueous layers.

*Example 3*

152 parts by weight of an aqueous solution of formaldehyde containing 50% formaldehyde and 7% melamine and having a pH of 3.7 was heated to 85° C. with 53 parts of melamine until the melamine was dissolved. 300 parts by weight of butanol was then added slowly over a period of 70 minutes, while heating at 95° C. Water and butyl alcohol were then distilled off and dry butanol was added from time to time to replace the distillate removed. Distillation was completed under a vacuum of 25 inches of mercury. 75 parts by weight of xylene was then added and the resin solution filtered. The finished lacquer contained 50% solids, had a viscosity of Y on the Gardner-Holdt scale, and a mineral spirits tolerance of 2.8–1.

*Example 4*

300 parts by weight of an aqueous solution of formaldehyde containing 47.7% formaldehyde and stabilized with 6.3% melamine was heated with 106 parts by weight of melamine until the melamine was dissolved and the pH of the solution then adjusted to 7.1 with dilute NaOH. 400 parts by weight of dry butanol containing 0.25 part by weight of methyl acid phosphate, as catalyst, was then slowly added with agitation and heating at about 65° C. After addition of the butanol and catalyst and upon heating for 20 minutes the reaction mixture was distilled to remove water. During distillation, 400 parts by weight of anhydrous butanol was added. During the last stages of distillation a vacuum was applied to reduce the distillation temperature and prevent undue polymerization of the resin. Distillation was continued until 475 parts by weight of fluid resin remained in the reaction vessel. 100 parts by weight of xylene was then added to reduce the solids content to 50.5%. The filtered lacquer had a viscosity at 25° C. of U–V and a mineral spirits tolerance of 2.0–1.

The clear resin solutions obtained as described in the foregoing examples may be used as clear lacquers or adhesives or may be blended with other resinous compositions, drying oils, cellulosic derivatives, plasticizers, solvents, pigments, driers, fillers, etc., in the manner described in the U. S. Patent to L. P. Moore No. 2,218,474, of October 15, 1940. Obviously, many modifications and variations may be made in the process described above without departing from the spirit and scope of the invention as defined in the appended claims.

What we claim is:

1. A method of preparing alkylated melamine-formaldehyde condensation products which comprises heating together in a reaction vessel a methanol-free aqueous solution of formaldehyde containing 35–50% by weight of formaldehyde and 1–10% by weight of melamine dissolved therein, melamine in molecular ratio of 2.5–6 moles of formaldehyde for each mole of melamine, and a water-immiscible primary alcohol, thereafter removing the water from the reaction mixture by azeotropic distillation, separating the water immiscible alcohol from the aqueous portion of the distillate and returning the alcohol to the reaction vessel.

2. A method of preparing butylated melamine-formaldehyde condensation products which comprises heating together in a reaction vessel a methanol-free aqueous solution of formaldehyde containing 35–50% by weight of formaldehyde and 1–10% by weight of melamine dissolved therein, melamine in the molecular ratio of 2.5–6 moles of formaldehyde for each mole of melamine, and n-butyl alcohol, thereafter dehydrating the resin solution by azeotropic distillation, separating the n-butyl alcohol from the aqueous portion of the distillate and returning the n-butyl alcohol to the reaction vessel.

3. A method of preparing alkylated melamine-formaldehyde condensation products which comprises heating together in a reaction vessel a methanol-free aqueous solution containing 40 to 50% by weight of formaldehyde and 1 to 10% by weight of melamine, melamine in the molecular ratio of about 5 moles of formaldehyde to each mole of melamine, and a water-immiscible primary alkyl alcohol, thereafter dehydrating the resulting resin solution by azeotropic distillation, separating the water immiscible alcohol from the aqueous portion of the distillate and returning the alcohol to the reaction vessel.

ROBERT C. SWAIN.
PIERREPONT ADAMS.